Patented July 1, 1941

2,247,495

UNITED STATES PATENT OFFICE 2,247,495

TERTIARY ALKYL UREA AND PROCESS FOR PREPARING SAME

Mortimer T. Harvey, East Orange, N. J., and Solomon Caplan, New York, N. Y., assignors to Harvel Research Corporation, a corporation of New Jersey No Drawing. Application April 15, 1938, Serial No. 202,220

7 Claims. (Cl. 260—553)

The present invention relates to chemical compounds and to methods and steps of making and using the same.

The chemical compounds of the present invention are mono-tertiary-alkyl ureas.

The chemical compounds of the present invention can be made by reacting a tertiary alkyl alcohol with urea, is the presence of sulphuric acid as a condensing agent.

Illustrative examples of the practice of the present invention are as follows:

*Example 1.*—To one molecular quantity of urea, placed in a container, substantially two molecular quantities of concentrated sulphuric acid (above 94%) are added gradually while keeping the temperature below about 70° C. After this there is added substantially two molecular quantities of tertiary butyl alcohol (over 99% strength), maintaining the temperature below 70° C. and stirring the reagent mixture. After this the reagent mixture is left to stand about twenty hours at normal temperature, the reaction product, mono tertiary butyl urea, being formed and dissolved in the reaction mixture. After this time the reaction mass is diluted with four or five volumes of water which throws out a portion of the reaction product in the form of crystals and in amount equal to about fifty to sixty per cent of the weight of the urea used. The filtrate is neutralized, as with sodium hydroxide, for example, whereupon there is given up the remainder of this crystalline reaction product. The total yield of mono tertiary butyl area is about seventy per cent of the theoretical.

Also, the reaction mass can be neutralized with a caustic solution sodium hydroxide, for example, using sufficient water to keep the sodium sulphate in solution upon which neutralization the reaction product is thrown out in crystals.

A quantitative analysis of the purified reaction product gave the following results: C: 53.59%; H: 10.51%; N: 22.32%; and O (by difference): 13.58%. This corresponds closely to the empirical formula $NH_2CON \cdot H \cdot C_4H_9$ and physical characteristics indicate that the product is mono tertiary butyl urea.

*Example 2.*—Using tertiary amyl alcohol in place of tertiary butyl alcohol by the same method as in Example 1 above, corresponding results are obtained. Quantitative analysis of the reaction product gave the following: C: 55.52%; H: 10.76%; N: 20.57%; O (by difference) 13.15%. This corresponds to the formula $$NH_2CO \cdot NH \cdot C_5H_{11}$$

and physical characteristics indicate that the compound is mono tertiary amyl urea.

*Example 3.*—One mole of urea and two moles of concentrated sulphuric acid are added together gradually between about 15° C. and about 25° C. after which one mole of methyl diethyl carbinol is added gradually at between about 15° C. and about 25° C. and the whole mixture is left standing for about ten to sixteen hours at normal temperature during which time the reaction product mono (α-methyl, α-ethyl) propyl urea is formed and dissolves in the reaction mixture. Upon the addition of several volumes of water an oil layer, containing the reaction product, separates and floats on the sulphuric acid layer. The sulphuric acid is separated from the oil layer and the latter is washed with water to remove traces of acid. The mono (α-methyl, α-ethyl) propyl urea is insoluble in water but is soluble in unreacted methyl diethyl carbinol or by-products thereof in said oil layer. After the washing, said oil layer is heated to evaporate the unreacted methyl diethyl carbinol or by-products and to leave the substantially pure mono (α-methyl, α-ethyl) propyl urea,

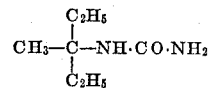

Quantitative analysis of the reaction product gave the following: C: 58.28%; H: 11.11%; N: 18.92%; O (by difference): 11.69% which closely confirms the above formula.

It is noted that in making the mixture of urea and sulphuric acid, the urea can be added to the sulphuric acid or the sulphuric acid can be added to the urea, the addition being made gradually and the temperature kept below about 70° C., also it is made of record and set forth as an advantageous step in the practice of the present invention that greater yields of the reaction products are obtained by keeping the temperatures of making the urea-sulphuric acid mixture and the addition of the tertiary alkyl alcohol to the urea-sulphuric acid mixture between about 15° C. and about 25° C. Also it is noted that the urea and tertiary alcohol used can be mixed together first and the sulphuric acid added to this mixture gradually below about 70° C. and preferably between about 15° C. and about 25° C. Also, the amount of sulphuric acid used is not limited to that given in the illustrative examples, and from about one-half mole to more than two moles can be used but the lower quantities of sulphuric acid give a lower yield of mono tertiary alkyl urea. Two moles of sulphuric acid in the illustrative example gives a substantial yield.

It is noted that it is not absolutely necessary to keep the molecular proportions set forth in Example 1, that is the proportions may vary either way, the ratio is of course kept to that which gives the most advantageous results with respect to both quantity of yield and cost of the reagents used.

The mono tertiary alkyl ureas of the present invention are suitable for the following uses. They can be condensed with aldehydes (reactive methylene group containing agents) to form resins, from one to two moles of formaldehyde (for example) to one mole of the mono-tertiary-alkyl urea. The mono-tertiary-alkyl urea of the present invention are suitable for use as accelerators for the vulcanization of rubber.

Having thus described our invention, what we claim as new and desire to protect by Letters Patent is:

1.

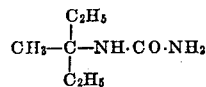

2. The method of making a mono tertiary alkyl urea which comprises making a mixture of tertiary alkyl alcohol, urea and sulphuric acid below 70° C.

3. The method of claim 2 in which the temperature is maintained between about 15° C. and about 25° C.

4. The method of making a mono tertiary alkyl urea which comprises mixing urea and sulphuric acid at a temperature below 70° C., then mixing therewith a tertiary alkyl alcohol at below 70° C., and leaving the reaction mixture stand to effect an optimum yield of symmetrical di tertiary alkyl urea.

5. The method according to claim 4 in which the temperature is kept between about 15° C. and about 25° C.

6. The method of making a mono tertiary alkyl urea which comprises reacting a tertiary alcohol, selected from the group consisting of tertiary butyl alcohol, tertiary amyl alcohol and methyl diethyl carbinol, with urea, with the aid of sulphuric acid, maintaining the temperature below 70° C.

7. The method of making a mono tertiary alkyl urea which comprises reacting a tertiary alcohol, selected from the group consisting of tertiary butyl alcohol, tertiary amyl alcohol and methyl diethyl carbinol, with urea, with the aid of sulphuric acid, maintaining the temperature between about 15° C. and about 25° C.

MORTIMER T. HARVEY.
SOLOMON CAPLAN.